Patented Jan. 6, 1953

2,624,752

UNITED STATES PATENT OFFICE 2,624,752

ESTERS OF TERTIARY ALKYL-SUBSTITUTED AROMATIC ACIDS

Rupert C. Morris, Berkeley, John L. Van Winkle, San Lorenzo, and De Loss E. Winkler, Orinda, Calif., assignors to Shell Development Company, San Francisco, Calif., a corporation of Delaware No Drawing. Application September 12, 1949,
Serial No. 115,318

10 Claims. (Cl. 260—476)

This invention relates to a new class of organic compounds. More particularly, the invention relates to esters of tertiary alkyl-substituted aromatic acids and to their use as plasticizers for vinyl-type polymers.

Specifically, the invention provides useful and valuable esters of aromatic monocarboxylic acids possessing a tertiary alkyl radical substituted on a ring carbon atom in para position relative to the ring carbon atom bearing the carboxyl group, and polyhydric alcohols. The invention further provides vinyl-type polymers particularly the vinyl halide polymers, plasticized with the above-described esters.

Vinyl-type polymers, such as the vinyl halide polymers, may be utilized for many applications in industry due to their wide range of properties. The polymers find application in the production of coating compositions, fibers, films, shaped articles, and the like. These polymers are usually difficult to process and are quite brittle, however, and before they can be utilized in their applications, it is usually necessary to add thereto some type of plasticizing agent. Compounds selected as plasticizers for these polymers should meet certain requirements. The compounds selected should be compatible with the polymers in an amount sufficient to impart the desired processing properties to the compounded resin, the plasticized composition should possess satisfactory strength and flexibility over a wide range of conditions, the plasticized material should be able to withstand long periods of exposure, particularly to high temperatures, without loss of plasticizer, and the addition of the plasticizers should not adversely affect the odor, color and inflammability of the finished product.

There have been many compounds suggested as plasticizers for the vinyl-type polymers in various patents and in the literature, but the results obtained by the use of these compounds have not been entirely satisfactory. The addition of these plasticizers usually imparts some degree of flexibility and processability to the polymers but in many cases the resulting compositions lack many of the more desired properties which are of considerable importance when the resins are utilized for their various industrial applications. Many of the suggested compounds, for example, have a high degree of volatility from the plasticized compositions and after the said compositions have been exposed to relatively high temperatures for extended periods of time the plasticizer is lost therefrom and the compositions begin to shrink and disintegrate. This fault is particularly serious when the plasticized compositions are utilized in warm climates or when the compositions are used to produce articles, such as surgical instruments, which must be frequently exposed to high temperatures.

It is an object of the invention, therefore, to provide a new class of plasticizer for the vinyl-type polymers. It is a further object to provide plasticized vinyl-type polymers which are able to withstand extended periods of exposure to high temperatures without losing shape and undergoing substantial disintegration. It is a further object to provide plasticized vinyl-type polymers having good strength and flexibility and improved resistance to water. It is a further object to provide improved plasticized vinyl halide polymers. It is a further object to provide a new class of organic compounds. It is a further object to provide novel organic compounds which possess many unexpected and beneficial properties. Other objects and advantages of the invention will be apparent from the following detailed description thereof.

It has now been discovered that these and other objects may be accomplished by the esters of aromatic monocarboxylic acids possessing a tertiary alkyl radical substituted on a ring carbon atom in para position relative to the ring carbon atom bearing the carboxyl group, and polyhydric alcohols. These esters have been found to be valuable plasticizers for the vinyl-type polymers, particularly the vinyl halide polymers, as they are highly compatible therewith and yield plasticized compositions having excellent tensile strength, improved flexibility, and good resistance to water. In addition, they have been found to have a very low rate of volatilization from the vinyl-type polymers and the compositions containing these esters are able to withstand long periods of exposure to air and/or relatively high temperatures without shrinking or undergoing any deterioration.

The acids utilized in producing the novel esters of the invention comprise aromatic monocarboxylic acids possessing at least one aromatic ring, one carbon atom of which, in para position to the ring carbon atom bearing the carboxyl group, being directly attached to a tertiary alkyl radical. The aromatic ring or rings contained within the acid molecule may be further substituted if desired with non-interfering substituents, such as halogen atoms, alkoxy radicals, and lower alkyl radicals. The expression "tertiary alkyl radical" as used throughout the specification and claims refers in a generic sense to those alkyl radicals which when attached to the aromatic ring possess at least one quaternary carbon atom in their chain, one of said quaternary carbon atoms preferably being not more than four carbon atoms removed from the terminal carbon atom of the radical which is to be joined to the said aromatic ring. The more preferred tertiary alkyl radicals are those which when joined to the aromatic ring contain a single quaternary carbon atom joined to three short chain alkyl radicals and to the said aromatic ring. Examples of the tertiary alkyl radicals are tert-butyl, tert-amyl, tert-hexyl, tert-octyl, 2,2-diethylbutyl, 3,3-ditert-butylamyl, 3,3-diisopropylbutyl, 3,3-diisobutylhexyl, and the like.

Examples of the above-described acids are p-tert-butyl-benzoic acid, p-tert-amylbenzoic acid, p-2,2-diethylbutylbenzoic acid, 4-tert-heptyl-1-naphthoic acid, 4-tert-amyl-1-anthroic acid, m-ethyl-p-tert-butylbenzoic acid, m-chloro-p-tert-butylbenzoic acid, m-cyano-p-tert-octylbenzoic acid, 2,5-dichloro-4-tert-octylbenzoic acid, p-3,3-diisopropylbutylbenzoic acid, 4-diisobutylhexyl-1-naphthoic acid, and 3,5-diethyl 4-tert-heptylbenzoic acid.

Preferred acids to be used in producing the novel esters are the para-tertiary alkyl-substituted mononuclear aromatic monocarboxylic acids wherein the said tert-alkyl radical contains from four to nine carbon atoms. Examples of these preferred acids are p-tert-amylbenzoic acid, p-tert-hexylbenzoic acid, m-ethyl-p-tert-nonylbenzoic acid, p-2,2-diethylbutylbenzoic acid, m-chloro-p-tert-octylbenzoic acid, 3,5-diethyl-4-tert-heptylbenzoic acid, 2,5-dichloro-4-diethyl-butylbenzoic acid, and m-cyano-p-tert-octylbenzoic acid.

The polyhydric alcohols used in producing the novel esters of the invention are alcohols containing a plurality, i. e., two, three, four or more, esterifiable hydroxyl groups in their molecule. The alcohols may be aliphatic, alicyclic, or heterocyclic. They may also contaiṅg oxygen or sulfur ether linkages in open-chain portions of their molecule and may be further substituted with non-interfering substituents, such as halogen atoms, alkoxy radicals, and the like. Examples of the polyhydric alcohols are ethylene glycol, glycerol, erythritol, pentaerythritol, mannitol methylitrimethylolmethane, 1,4,6-octanetriol, butanediol, 1,3 - pentanediol, 1,4 - hexanediol, 2,8-dodecanediol, 1,8-octanediol, chloropentanediol-1,5, glycerol monoethyl ether, diethylene glycol, triethylene glycol, 2-ethylhexanediol-1,4, 3,3'-thiodipropanol, 4,4'-thiodibutanol, 4,4'-thiodihexanol, 3,5-dithiahexanediol-1,6, i. e., HO(CH₂)₂SCH₂SCH₂OH, 3,6-dithiaoctanediol-1,8, and cyclohexanediol-1,4.

Preferred polyhydric alcohols to be used in producing the novel esters are the open-chain aliphatic alcohols possessing from 2 to 3 esterifiable hydroxyl groups and containing from 2 to 18 carbon atoms. Examples of these preferred polyhydric alcohols are diethylene glycol, glycerol, 1,4,6-heptanetriol, 2,5-pentanediol, 3-methyl-2,4-hexanediol, 2,4-butanediol, triethylene glycol, tetraethylene glycol, 2,7-octanediol, 2,8-dodecanediol, 3,7-tetradecanediol, 1,5,8-dodecanediol, and glycerol monomethyl ether.

Particularly preferred polyhydric alcohols are the open-chain dihydric alcohols containing from 2 to 12 carbon atoms, preferably having their hydroxyl groups attached to non-adjacent carbon atoms, such as diethylene glycol, 2,5-pentanediol, 3-methyl-2,4-hexanediol, 2,4-butanediol, trimethylene glycol, tetraethylene glycol, and 2,7-octanediol.

Coming under special consideration as particularly preferred alcohols, especially when the resulting esters are to be used as plasticizers for the vinyl halide polymers, are the open-chain aliphatic dihydric alcohols having at least one thio ether linkage, i. e., a —S— linkage, joined directly to carbon atoms, and preferably containing not more than 15 carbon atoms. Examples of these preferred alcohols are 3,3'-thiodipropanol, 4,4'-thiodibutanol, 3,5-dithiahexanediol-1,6, 4,4'-thiodihexanol, 2,5-dithiaoctanediol-1,8, 2,5,7 - trithiadodecanediol - 1,9, 4,7 - dithiadodecanediol-1,10, 4,4'-thiodihexanol, and the like. Especially preferred thio alcohols are the open-chain aliphatic dihydric alcohols having one thio ether linkage joined to carbon atoms and containing from 4 to 15 carbon atoms.

The novel esters of the invention are theoretically obtained by esterifying one of the above-described alcohols with one or more of the above-described tertiary alkyl-substituted aromatic acids. Examples of the novel esters are 3,3'-thiodipropanol bis - p - tert - butylbenzoate, 4,4'-thiodipropanol bis - p - tert - amylbenzoate, 1,5-pentanediol bis-p-tert-amylbenzoate, diethylene glycol bis-p-3,3-dibutylhexylbenzoate, 1,2-pentanediol bis-p-tert-hexylnaphthoate, 1,4-butanediol bis-p-tert-octylbenzoate, 1,5-pentanediol p-tert-amylbenzoate p-tert-hexylbenzoate, 3,3'-thiodipropanol bis - 4 - tert - amyl - 1 - anthroate, tetraethylene glycol bis-3,5-dichloro-4-tert-hexylbenzoate, 1,6-hexanediol bis-m-cyano-p-tert-octylbenzoate, and 3,3'-thiodibutanol p-tert-decylbenzoate p-tert-butylbenzoate.

The preferred esters of the invention, i. e., those prepared from the preferred alcohols and preferred acids described above, may be illustrated by diethylene glycol bis-p-tert-butylbenzoate, 3,3'-thiodipropanol bis-p-tert-butylbenzoate, 1,5-pentanediol bis-p-tert-hexylbenzoate, 1,4-butanediol p-tert-amylbenzoate p-tert-decylbenzoate, 4,7-dithiadodecanediol-1,10 bis-p-tert-amylbenzoate, 4,4'-thiodihexanol bis-p-tert-heptylbenzoate, 2,5,7-trithiadodecanediol-1,9 bis-m-cyano-p-tert octylbenzoate, and 3,5-dithiahexanediol-1,6 bis-p-tert-decylbenzoate.

The above-described esters may be prepared by any suitable method. They may be prepared by direct esterification of the above-described acids and polyhydric alcohols in the presence of an esterification catalyst, by reacting the polyhydric alcohols with an acid chloride in pyridine, or by an ester-exchange reaction.

It is usually preferred, however, to prepare the esters by direct esterification. According to this method, the acids and polyhydric alcohols are heated together and the water formed during the reaction is removed, preferably by distillation. Catalysts may be used in the direct esterification process if desired. Such catalyst may be exemplified by p-toluenesulfonic acid, ethanesulfonic acid, hydrobromic acid, chloroacetic acid, sulfuric acid, benzenesulfonic acid, formic acid, boron and silicon fluorides, acid salts, such as mono-sodium and mono-potassium sulfates, and salts of strong acids and weak bases, such as aluminum sulfate, zinc chloride, zinc sulfate, and the like. The amount of the catalyst employed will vary over a wide range depending upon the particular type of reactants, catalyst, and reaction conditions employed. In most cases, the amount of catalyst will vary between 0.1% to 5% by weight of reactants. Preferred amounts of catalyst to be employed in the esterification process vary between 0.5% to 2% by weight of reactants.

The amount of acid and polyhydric alcohol to be added to the reaction mixture will vary over a considerable range depending upon the type of product desired. In general, at least one mole of acid should be utilized for every hydroxyl group to be esterified. Thus, if two of the hydroxyl groups of the polyhydric alcohol are to be esterified with the substituted carbocyclic acids the alcohol will preferably be reacted with a double molar quantity to slight excess, i. e. 10% to 20% excess, of the desired acids. The exact proportions of acid and polyhydric alcohol to be utilized may easily be determined for each individual case.

The esterification may be accomplished in the presence or absence of solvents or diluents. In case the solvents or diluents are desired, inert organic compounds, such as benzene, toluene, cyclohexanone, and xylene, and mixtures thereof, which do not interfere with the reaction may be used.

The temperature employed during the esterification may vary over a considerable range depending upon the type of reactants and catalysts to be employed. In most cases the temperature will range between about 40° C. and 250° C. with a preferred range being between 60° C. and 100° C. Higher or lower temperatures may be employed if desired or necessary.

In some cases it may be desirable to conduct the reaction in an inert atmosphere, such as nitrogen and carbon dioxide. Atmospheric, superatmospheric, or subatmospheric pressures may be used.

The separation of the esters formed in the reaction may be accomplished by any suitable means, such as extraction, distillation, fractional precipitation, and the like.

As indicated, the novel esters of the invention are particularly valuable as plasticizers for vinyl-type polymers and when used in this capacity form compounded resins having many improved properties. The vinyl-type polymers that may be plasticized with the novel esters are the homopolymers, copolymers and interpolymers of vinyl-type monomers. The expression "vinyl-type monomers" includes all those organic compounds containing at least one $CH_2=C<$ group in their molecule. Examples of these monomers are styrene, alpha-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride, the vinyl esters of the inorganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate, the vinyl esters of the unsaturated acids, such as vinyl acrylate, vinyl crotonate, and vinyl methacrylate; the vinyl ethers, such as vinyl ethyl ether, vinyl butyl ether, and vinyl allyl ether, and the vinyl ketones, such as vinyl butyl ketone, and vinyl ethyl ketone.

A preferred group of vinyl-type polymers to be plasticized with the novel esters of the invention are the polymers of the halogen-containing vinyl-type monomers. Examples of this preferred group of polymers are polyvinyl chloride, polyvinyl bromide, polyvinylidene chloride, polyvinylidene bromide, copolymers of vinyl chloride and vinyl acetate, copolymers of vinyl chloride and vinylidene chloride, copolymers of allyl chloride and vinyl chloride, copolymers of vinylidene chloride and vinyl acetate, copolymers of vinyl chloride and methyl methacrylate, and the like.

Particularly preferred polymers to be plasticized with the novel esters of the invention are the vinyl halide polymers. The expression "vinyl halide polymers" as used throughout the specification and claims refers generically to the homopolymers, copolymers and interpolymers containing a predominant quantity, i. e., at least 60% by weight of the vinyl halides, as vinyl chloride and vinyl bromide. Examples of these preferred polymers are polyvinyl chloride, polyvinyl bromide, copolymers of vinyl chloride and vinyl propionate, copolymers of vinyl bromide and methyl methacrylate, and the like.

A single ester may be used as the plasticizer or a mixture of two or more of the compounds may be utilized. In addition, the novel esters may be used as plasticizers in combination with known plasticizers, such as dioctyl phthalate, dibutyl phthalate, tricresyl phosphate, and the like.

The amount of the esters to be incorporated with the above-described vinyl-type polymers may vary over a considerable range depending upon the particular type of polymer to be utilized, the intended use of the compounded resins, etc. In most cases the amount of the plasticizer will vary from about 20 to 150 parts by weight for every 100 parts by weight of resin. A more preferred range of plasticizer to be utilized comprises 40 parts to 75 parts by weight of plasticizer for every 100 parts by weight of resin.

Fillers and pigments such as whiting, channel black, clay, gum rosin, silica and others, and stabilizers, such as litharge, other lead compounds, some oxides of the bismuth and barium types and some silicates may also be added to the polymers along with the novel esters of the invention.

The vinyl-type polymers and the ester plasticizer may be compounded together by means of conventional equipment such as mills of the heated roll type or internal mixers. The plasticizer and other compounding ingredients, such as fillers and stabilizers, are worked into the vinyl polymer so that they are thoroughly dispersed therein by means of such equipment, and the resultant composition then molded, calendered, extruded or otherwise formed into articles of the desired shape by conventional procedure.

The novel esters of the invention may also be utilized in other important capacities in industry. They are valuable, for example, as lubricating oils or additives therefor, asphalt adhesive agents, water-proofing agents for inorganic greases, thickening agents or viscosity index improvers, solvents, rubber preservatives, vulcanizing accelerators, additives for insecticidal and germicidal compositions, textile lubricants, additives for dye preparations, wetting agents, dispersing agents for oils, detergents, polishes, and the like.

To illustrate the manner in which the invention may be carried out the following examples are given. It is to be understood, however, that the examples are for the purpose of illustration and the invention is not to be regarded as limited to any of the specific conditions recited therein.

Unless otherwise specified, parts described in the examples are parts by weight.

In the following examples the plasticizer was compounded with the vinyl-type polymer by mixing the two ingredients together with two parts (per 100 parts of polymer) of a trade stabilizer, milling the mixture together on a roll mill at a temperature between 130° C. and 150° C., and then molding the resulting sheets at 160° C. for two minutes.

Volatility was determined on compression molded discs two inches in diameter and 0.045 inch thick. These discs were conditioned for one hour at 100° C., weighed, placed back in the oven for 100 hours at 100° C. and re-weighed. The difference in weight represents the amount of plasticizer lost. The loss of the plasticizer was then compared with the loss of a similar compound plasticized with bis(2-ethylhexyl) phthalate, the latter being arbitrarily assigned a value of one.

Example I

About 125 parts of p-tert-butylbenzoic acid, 34 parts of diethylene glycol, and 105 parts of toluene were placed in a kettle attached to a separating still-head. The apparatus was swept out with carbon dioxide for one-half hour and 0.2 part of sulfuric acid was added. The mixture was then heated to reflux with a slow stream of carbon dioxide passing through the reaction chamber. When no further water separated the reaction mixture was diluted with 2000 parts of benzene, treated with decolorizing charcoal, and then washed with water and dilute sodium carbonate. After flashing off the benzene and stabilizing at 2–3 mm., a viscous oil was recovered which was identified as diethylene glycol bis-p-tert-butylbenzoate. The ester had the following properties: $n\ 20/D\ 1.5288$, specific gravity $20/4\ 1.0686$, sap. value eg./100 grams found 0.473, calculated 0.469.

Example II

About 125 parts of p-tert-butylbenzoic acid, 48 parts of 3,3'-thio-di-1-propanol and 100 parts of toluene were placed in a kettle described in Example I. The apparatus was swept out with carbon dioxide and 0.2 part of sulfuric acid was added. The mixture was then heated to reflux with a slow stream of carbon dioxide being passed through the reaction chamber. When no further water separated the reaction mixture was diluted with 200 parts of benzene, and the resulting mixture treated as in Example I. After flashing off the benzene and stabilizing at 2–3 mm. a viscous oil was recovered which was identified as 3,3'-thiodipropanol bis-p-tert-butylbenzoate. This ester had the following properties: $n\ 20/D\ 1.5370$, sp. gravity $20/4\ 1.0768$, viscosity 100° F. cs. 38.15, viscosity 210° F. cs. 20.63, V. I. 62.

Example III

About 125 parts of p-tert-butylbenzoic acid, 38 parts of 1,5-pentanediol and 105 parts of toluene were placed in the kettle described above. The apparatus was swept out with carbon dioxide and 0.2 part of sulfuric acid was added. The mixture was heated to reflux with a slow stream of carbon dioxide being passed through the reaction chamber. When no further water separated the reaction mixture was diluted with benzene as described above. After flashing off the benzene a viscous liquid was recovered which was identified as 1,5-pentanediol bis-p-tert-butylbenzoate. This ester had the following properties: $n\ 20/D\ 1.5270$, sp. gr. $20/4\ 1.0397$, vis. 100° F. cs. 43.92, vis. 210° F. cs. 15.71, sap. value eg./100 g., fd. 0.491, calc. 0.472.

Example IV

About 125 parts of p-tert-butylbenzoic acid were mixed with 40 parts of dipropylene glycol, 125 parts of toluene and 0.2 part of sulfuric acid and the resulting mixture heated under reflux during which time the theoretical amount of water was collected as an azeotrope. The mixture was then diluted with benzene and treated as shown in Example I. After flashing off the benzene a viscous oil was recovered which was identified as dipropylene glycol bis-p-tert-butylbenzoate. This ester had the following properties: $n\ 20/D\ 1.5167$, sp. gr. 1.0443, ester value eg./100 g., fd. 0.426, calc. 0.441.

Example V

About 125 parts of p-tert-butylbenzoic acid were mixed with 40 parts of 1,3-butylene glycol, 125 parts of toluene and 0.2 part of sulfuric acid and the resulting mixture heated under reflux during which time the theoretical amount of water was collected as an azeotrope. The mixture was then diluted with benzene and treated as shown in Example I. After flashing off the benzene a viscous oil was recovered which was identified as 1,3-butylene glycol bis-p-tert-butylbenzoate. This ester had the following properties: $n\ 20/D\ 1.5180$ and sp. gr. $20/4\ 1.0268$.

Example VI

About 100 parts of p-tert-amylbenzoic acid were mixed with 40 parts of diethylene glycol, 120 parts of toluene and 0.2 part of sulfuric acid and the resulting mixture heated under reflux while the theoretical amount of water was collected as an azeotrope. The mixture was then diluted with benzene and treated as shown in Example I. After flashing off the benzene a viscous liquid was obtained which was identified as diethylene glycol bis-p-tert-amylbenzoate.

Example VII

About 125 parts of p-tert-butylbenzoic acid were mixed with 80 parts of 4,7-dithiadecanediol-1,10, 125 parts of toluene and 0.2 part of sulfuric acid and the resulting mixture heated under reflux while the theoretical amount of water is collected as an azeotrope. The mixture is then diluted with benzene and treated as shown in Example I. After flashing off the benzene a viscous oil is obtained which is identified as 4,7-dithiadecanediol-1,10 bis-p-tert-butylbenzoate.

Example VIII

About 210 parts of p-tert-decylbenzoic acid are mixed with 80 parts of 3,3'-thiodibutanol, 125 parts of toluene and 0.2 part of sulfuric acid and the resulting mixture heated under reflux while the theoretical amount of water is collected as an azeotrope. The mixture is then diluted with benzene and treated as shown in Example I. After flashing off the benzene 3,3'-thiodibutanol bis-p-tert-decylbenzoate is obtained as the final product.

Example IX

About 100 parts of p-tert-hexylbenzoic acid are mixed with 50 parts of 1,4-butanediol, 120 parts of benzene and 2 parts of p-toluenesulfonic acid and the resulting mixture heated under reflux while the theoretical amount of water is collected as an azeotrope. The mixture is then diluted with benzene and treated as shown in Example I. After flashing off the benzene a viscous oil is obtained which is identified as 1,4-butanediol bis-p-tert-hexylbenzoate.

*Example X*

About 100 parts of polyvinyl chloride were compounded with 60 parts of 1,5-pentanediol bis-p-tert-butylbenzoate according to the above-described process. The resulting sheet possessed good tensile strength, and improved flexibility. The plasticized composition showed a volatility of only 0.1 that of a similar composition plasticized with bis(2-ethylhexyl) phthalate.

A similar sheet prepared by plasticizing 100 parts of polyvinyl chloride with 60 parts of tetraethylene glycol dibenzoate showed a high volatility of 3.0. A similar sheet prepared by plasticizing 100 parts of polyvinyl chloride with 60 parts of tetraethylene glycol di-p-toluate showed a high volatility of 3.7.

*Example XI*

About 100 parts of polyvinyl chloride were compounded with 60 parts of 3,3'-thio-di-1-propanol bis-p-tert-butylbenzoate according to the above-described process. The resulting sheets possessed good tensile strength, excellent flexibility over a wide range of conditions and good resistance to water. The plasticized composition showed a volatility of only 0.1 that of a similar sheet plasticized with bis(2-ethylhexyl) phthalate.

*Example XII*

About 100 parts of polyvinyl chloride were compounded with 60 parts of diethylene glycol p-tert-amylbenzoate according to the above-described process. The resulting sheet possessed good tensile strength and flexibility. The plasticized composition showed a volatility of only 0.2 that of a similar sheet plasticized with bis(2-ethylhexyl) phthalate.

*Example XIII*

About 100 parts of polyvinyl chloride were compounded with 60 parts of diethylene glycol bis-p-tert-butylbenzoate according to the above-described process. The resulting sheet possessed good tensile strength and flexibility. The plasticized composition showed a volatility of only 0.3 that of a similar sheet plasticized with bis(2-ethylhexyl) phthalate.

*Example XIV*

About 100 parts of polyvinyl chloride were compounded with 60 parts of 1,3-butylene glycol p-tert-butylbenzoate according to the above-described process. The resulting sheet possessed good tensile strength and flexibility and good heat stability.

*Example XV*

About 100 parts of polyvinyl chloride are compounded with 60 parts of 4,7-dithiadecanediol-1,10 bis-p-tert-butylbenzoate according to the above-described process. The resulting sheet possesses good tensile strength, improved flexibility over a wide range of temperatures, good water resistance and a very low volatility.

*Example XVI*

About 100 parts of a copolymer of 95% vinyl chloride and 5% vinyl acetate are compounded with 50 parts of 3,3'-thiodibutanol bis-p-tert-decylbenzoate. The resulting sheet possesses good tensile strength and flexibility over a wide range of conditions and excellent heat stability and water resistance.

We claim as our invention:
1. 3,3'-thiodipropanol bis-p-tert-butylbenzoate.
2. 1,5-pentanediol bis-p-tert-butylbenzoate.
3. Diethylene glycol bis-p-tert-butylbenzoate.
4. 4,7-dithiadecanediol-1,10 bis-p-tert-butylbenzoate.
5. 3,3'-thiodialkanol bis-p-tert-alkylbenzoate.
6. A neutral ester of p-tert-alkylbenzoic acid and an open-chain aliphatic dihydric alcohol having at least one thio ether linkage joined directly to carbon atoms and containing not more than 15 carbon atoms, wherein the said p-tert-alkylbenzoic acid is the only acid used to esterify the said alcohol.
7. A neutral ester of p-tert-alkylbenzoic acid and an open-chain aliphatic alcohol possessing from 2 to 3 esterifiable hydroxyl groups and containing from 2 to 18 carbon atoms, wherein the said p-tert-alkylbenzoic acid is the only acid used to esterify the said alcohol.
8. An ester of a para-tertiary alkyl-substituted benzoic acid and a polyhydric alcohol containing at least two esterifiable hydroxyl groups, wherein the said para-tertiary alkyl-substituted benzoic acid is the only acid used to esterify the said polyhydric alcohol.
9. A normally liquid neutral ester of an alkylene glycol containing no more than 12 carbon atoms and a p-tert-alkylbenzoic acid wherein the alkyl side chain contains from 4 to 9 carbon atoms, wherein the said p-tert-alkylbenzoic acid is the only acid used to esterify the said glycol.
10. A neutral ester of an open-chain aliphatic dihydric alcohol containing no more than 12 carbon atoms and having the hydroxyl groups attached to non-adjacent carbon atoms, and a p-tert-alkylbenzoic acid, wherein the said p-tert-alkylbenzoic acid is the only acid used to esterify the said alcohol.

RUPERT C. MORRIS.
JOHN L. VAN WINKLE.
DE LOSS E. WINKLER.

REFERENCES CITED

The following references are of record in the file of this patent:

UNITED STATES PATENTS

| Number | Name | Date |
| --- | --- | --- |
| 1,998,489 | Canon et al. | Apr. 23, 1935 |
| 2,213,783 | Kyrides | Sept. 3, 1940 |
| 2,356,586 | Hentrieh et al. | Aug. 22, 1944 |
| 2,363,618 | Patrick | Nov. 28, 1944 |
| 2,518,940 | Rust et al. | Aug. 15, 1950 |

OTHER REFERENCES

Beilstein: Vierte auflage, vol. 9, p. 485.